United States Patent
Alwan

Patent Number: 6,121,721
Date of Patent: Sep. 19, 2000

[54] UNITARY SPACERS FOR A DISPLAY DEVICE

[75] Inventor: James J. Alwan, Boise, Id.

[73] Assignee: Micron Technology, Inc., Boise, Id.

[21] Appl. No.: 09/280,889

[22] Filed: Mar. 29, 1999

Related U.S. Application Data

[62] Division of application No. 08/777,653, Dec. 31, 1996, Pat. No. 5,888,112.

[51] Int. Cl.$^7$ ...................................................... H03K 5/13
[52] U.S. Cl. ................................................................ 313/309
[58] Field of Search ........................... 313/495, 496, 313/497, 292, 258

[56] References Cited

U.S. PATENT DOCUMENTS

| | | | |
|---|---|---|---|
| 3,424,909 | 1/1969 | Rougeot | 250/207 |
| 3,979,621 | 9/1976 | Yates | 313/105 CM |
| 3,990,874 | 11/1976 | Schulman | 65/4 B |
| 4,091,305 | 5/1978 | Poley et al. | 313/220 |
| 4,183,125 | 1/1980 | Meyer et al. | 29/25.15 |
| 4,451,759 | 5/1984 | Heynisch | 313/495 |
| 4,705,205 | 11/1987 | Allen et al. | 228/180.2 |
| 4,923,421 | 5/1990 | Brodie et al. | 44/24 |
| 4,940,916 | 7/1990 | Borel et al. | 313/306 |
| 5,015,912 | 5/1991 | Spindt et al. | 313/497 |
| 5,070,282 | 12/1991 | Epsztein | 315/383 |
| 5,136,764 | 8/1992 | Vasquez | 29/25.01 |
| 5,151,061 | 9/1992 | Sandhu | 445/24 |
| 5,205,770 | 4/1993 | Lowrey et al. | 445/24 |
| 5,229,691 | 7/1993 | Shichao et al. | 315/366 |
| 5,232,549 | 8/1993 | Cathey et al. | 456/633 |
| 5,324,602 | 6/1994 | Inada et al. | 430/23 |
| 5,329,207 | 7/1994 | Cathey et al. | 315/169.1 |
| 5,342,477 | 8/1994 | Cathey | 156/643 |
| 5,342,737 | 8/1994 | Georger, Jr. et al. | 430/324 |
| 5,347,292 | 9/1994 | Ge et al. | 345/74 |
| 5,371,433 | 12/1994 | Home et al. | 313/495 |
| 5,374,868 | 12/1994 | Tjaden et al. | 313/310 |
| 5,391,259 | 2/1995 | Cathey et al. | 156/643 |
| 5,413,513 | 5/1995 | Home et al. | 445/24 |
| 5,445,550 | 8/1995 | Xie et al. | 445/24 |
| 5,448,131 | 9/1995 | Taylor et al. | 313/309 |
| 5,449,970 | 9/1995 | Kumar et al. | 313/495 |
| 5,486,126 | 1/1996 | Cathey et al. | 445/25 |
| 5,589,731 | 12/1996 | Fahlen et al. | 313/495 |
| 5,708,325 | 1/1998 | Anderson et al. | 313/495 |
| 5,733,160 | 3/1998 | Jeng et al. | 445/24 |
| 5,757,131 | 5/1998 | Tsuchiya | 445/24 |
| 5,834,891 | 11/1998 | Novich | 313/292 |

FOREIGN PATENT DOCUMENTS

| | | |
|---|---|---|
| 690472 A1 | 1/1996 | European Pat. Off. . |
| 2-165540 | 6/1990 | Japan . |
| 3-179630 | 8/1991 | Japan . |

*Primary Examiner*—Nimeshkumar D. Patel
*Assistant Examiner*—Joseph Williams
*Attorney, Agent, or Firm*—Hale and Dorr LLP

[57] ABSTRACT

A method for forming spacers for a display device includes steps of contacting a substrate of one of a cathode and a faceplate substrate with a member, drawing the member from the substrate to form a filament, and detaching the member from the filament. The filament can be further planarized to a desired height and shape. The filament extends to the other of the cathode and faceplate.

27 Claims, 4 Drawing Sheets

UNITARY SPACERS FOR A DISPLAY DEVICE

CROSS REFERENCE TO RELATED APPLICATIONS

This is a division of U.S. patent application Ser. No. 08/777,653, filed Dec. 31, 1996, now U.S. Pat. No. 5,888,112.

GOVERNMENT CONTRACT INFORMATION

This invention was made with Government Support under Contract No. DABT63-93-C-0025 awarded by the Advanced Research Projects Agency (ARPA). The Government may have certain rights in this invention.

BACKGROUND OF THE INVENTION

The present invention relates to displays, and more particularly to processes for forming spacers in a field emission displays (FED).

Referring to FIG. 1, in a typical FED (a type of flat panel display), a cathode 21 has a substrate 10, such as glass, on which conductive layers 12, such as doped polycrystalline silicon or aluminum, are formed. Conical emitters 13 are constructed on conductive layers 12. Surrounding emitters 13 are a dielectric layer 14 and a conductive extraction grid 15 formed over dielectric layer 14. When a voltage differential from a power source 20 is applied between conductive layers 12 and grid 15, electrons 17 bombard pixels 22 of a phosphor coated faceplate (anode) 24. Faceplate 24 has a transparent dielectric layer 16, preferably glass, a transparent conductive layer 26, preferably indium tin oxide (ITO), a black matrix grille (not shown) formed over conductive layer 26 and defining regions, and phosphor coating over regions defined by the grille.

Cathode 21 may be formed on a backplate or it can be spaced from a separate backplate. In either event, cathode 21 and faceplate 24 are spaced very close together in a vacuum sealed package. In operation, there is a potential difference on the order of 1000 volts between conductive layers 12 and 26. Electrical breakdown must be prevented in the FED, while the spacing between the plates must be maintained at a desired thinness for high image resolution.

A small area display, such as one inch (2.5 cm) diagonal, may not require additional supports or spacers between faceplate 24 and cathode 21 because glass substrate 16 in faceplate 24 can support the atmospheric load. For a larger display area, such as a display with a thirty inch (75 cm) diagonal, several tons of atmospheric force will be exerted on the faceplate, thus making spacers is important if the faceplate is to be thin and lightweight.

It would be desirable to have a convenient and efficient method to accurately form and locate spacers in a FED.

SUMMARY OF THE INVENTION

This invention includes methods for forming spacers for a display, such as an FED, that has a cathode with a substrate and a faceplate with a substrate. One method includes contacting one of the substrates with a heated member, drawing the heated member away from the substrate to produce an integral filament, and detaching the member from the filament. Another method includes steps of heating the substrate, contracting the heated substrate with a member, drawing the member away from the substrate to form a filament, and detaching the member from the filament. After either of these series of steps, the resulting filament can be further processed, e.g., by providing filler around the spacers and performing a planarization process that can be mechanical, chemical, or a combination of mechanical and chemical.

In another aspect, the invention includes a display that has a faceplate and a cathode, at least one of which has a number of integral spacer filaments extending toward the other of the faceplate and cathode. These spacers are made from the same material as the substrate without a break or interruption, as opposed to the same or different material attached to the substrate.

The present invention thus provides spacers at precise locations and integral with the substrate, and further avoids the need for forming an adhesive at one end. Other features and advantages will become apparent from the following detailed description, drawings, and claims.

DETAILED DESCRIPTION OF THE INVENTION

Figure 2:

Referring to FIGS. 2–5, to fabricate spacers for a display according to the present invention, a member 30, preferably a metallic needle or rod that has good thermal conductivity, is brought into contact with a substrate 32 that may be used for or be part of a faceplate or a cathode. Substrate 32 is preferably made of glass, so its softening temperature depends on the type of glass used, e.g., about 525° C. for soda lime glass or about 650° C.–700° C. for borosilicate glass. Member 30 is heated to a sufficient temperature to melt or soften substrate 32 in a general area 38 of contact (FIG. 2). Member 30 may be pushed slightly below the original surface of substrate 32, e.g., several microns below. It is understood that substrate 32 may be heated to facilitate local melting or softening in a efficient and timely manner. Once this is done, member 30, which is heated, may be pushed slightly below the original surface of substrate 32 for purposes of making a spacer.

Figure 1:
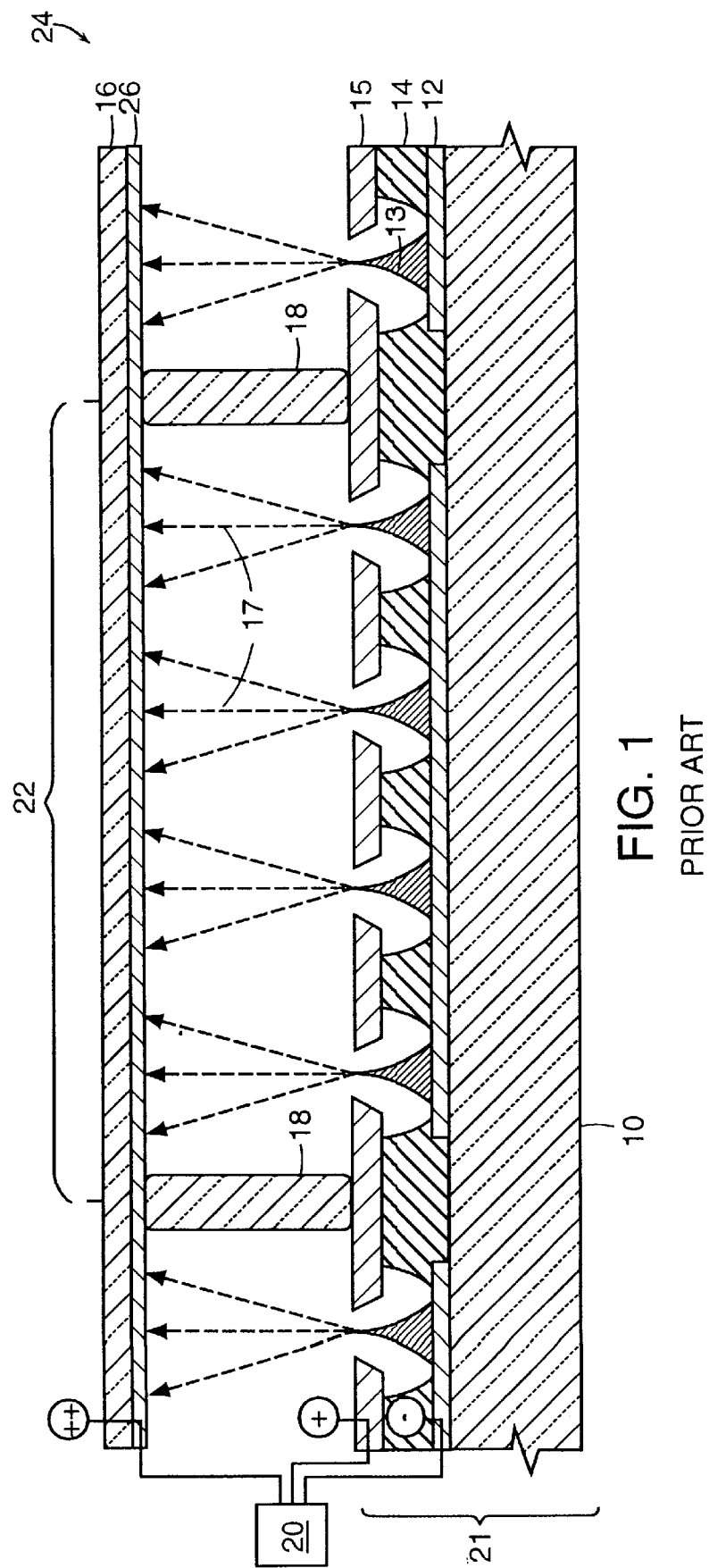
FIG. 1 is a cross-sectional view of a known FED with a faceplate, a cathode, and spacers therebetween.
Figure 4:
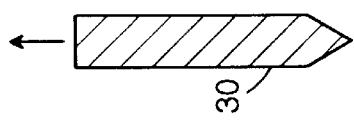
FIGS. 2–5 are cross-sectional views illustrating steps for forming spacers according to the present invention.
Figure 3:
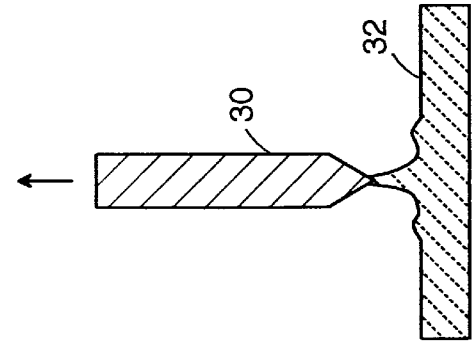

After localized melting or softening has occurred in area 38, member 30 is drawn away from substrate 32 along a direction orthogonal to the substrate, thereby pulling an elongated filament 34 that extends orthogonally from a surface of substrate 32 (FIG. 3). After filament 34 has been drawn a desired length from substrate 32, preferably at least about 200 microns, the temperature of member 30, substrate 32, and filament 34 is reduced so that filament 34 cools and revitrifies. Member 30 is then detached from contact with filament 34 with one of several methods, such as drawing member 30 away, rapidly cooling member 30 and substrate 32, and/or ultrasonic vibration (FIG. 4).

Figure 5:
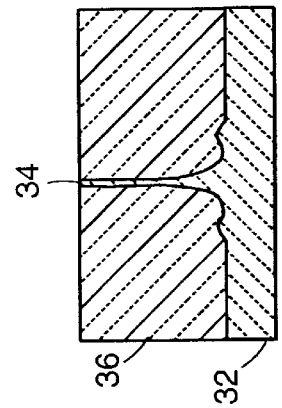

Referring to FIG. 5, after removing member 30 from filament 34, filament 34 may be surrounded and thereby supported with a polishable filler 36, such as a white wax (glycol phthalate). Filament 34 can then be planarized to a desired height and polished flat and reduced for further assembly. The planarization and polishing may be performed using conventional methods, including chemical and/or mechanical methods. With a method of chemical mechanical planarization (CMP), a wafer of semiconductor material is moved relative to a wetted polishing surface under a controlled chemical slurry containing a polishing agent such as alumina or silica as an abrasive medium, and with industrial grade diamonds or chemical etchants as a polishing agent.

To produce multiple filaments, the steps of contacting, drawing away, and detaching can be performed multiple times to produce filaments one at a time before planarizing and/or polishing. Alternatively, a number of filaments can be formed simultaneously with many members 30 (or one assembly with multiple needles).

Figure 6:
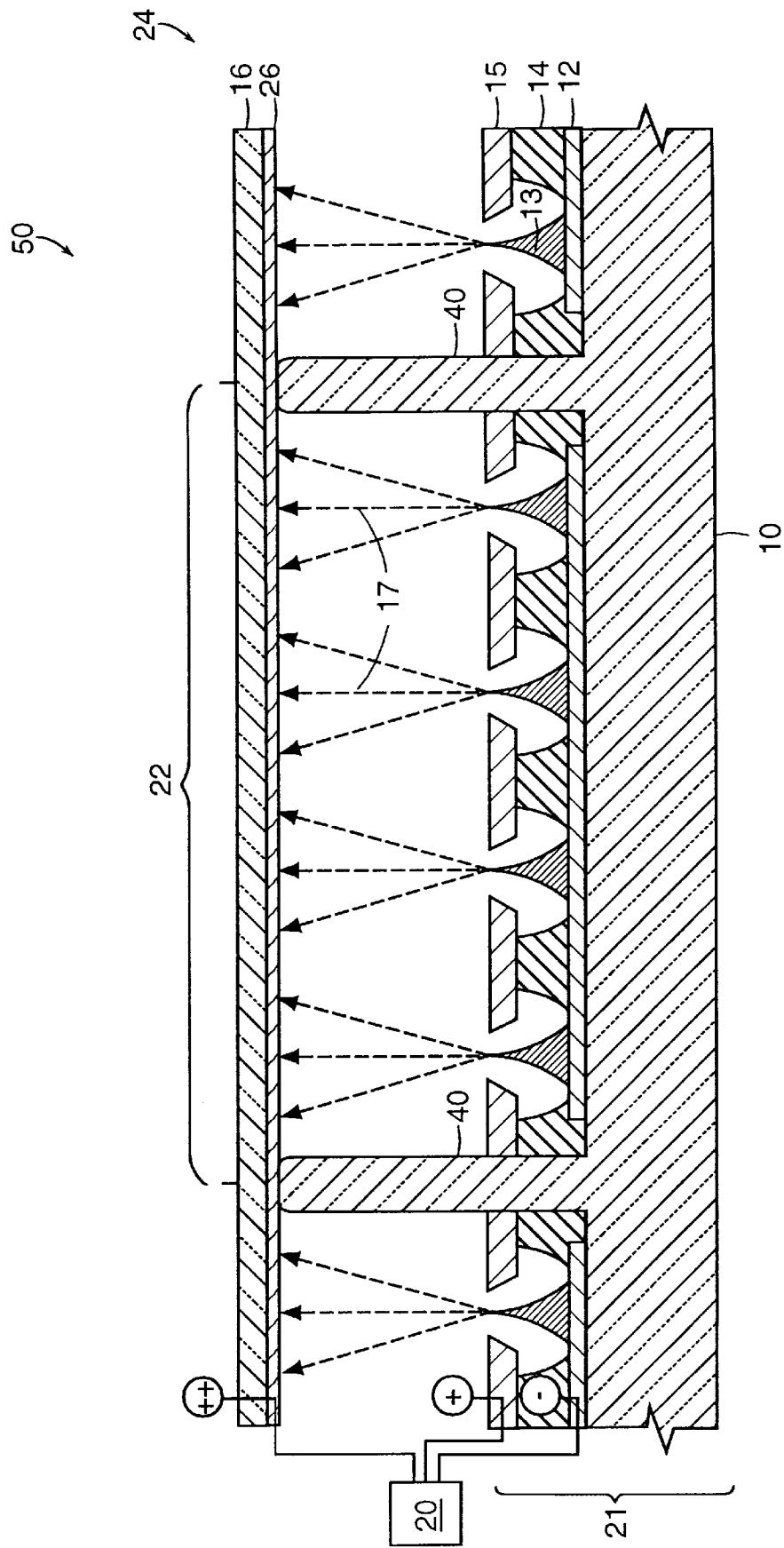
FIGS. 6 and 7 are cross-sectional views of two embodiments of an FED according to the present invention.
Figure 7:
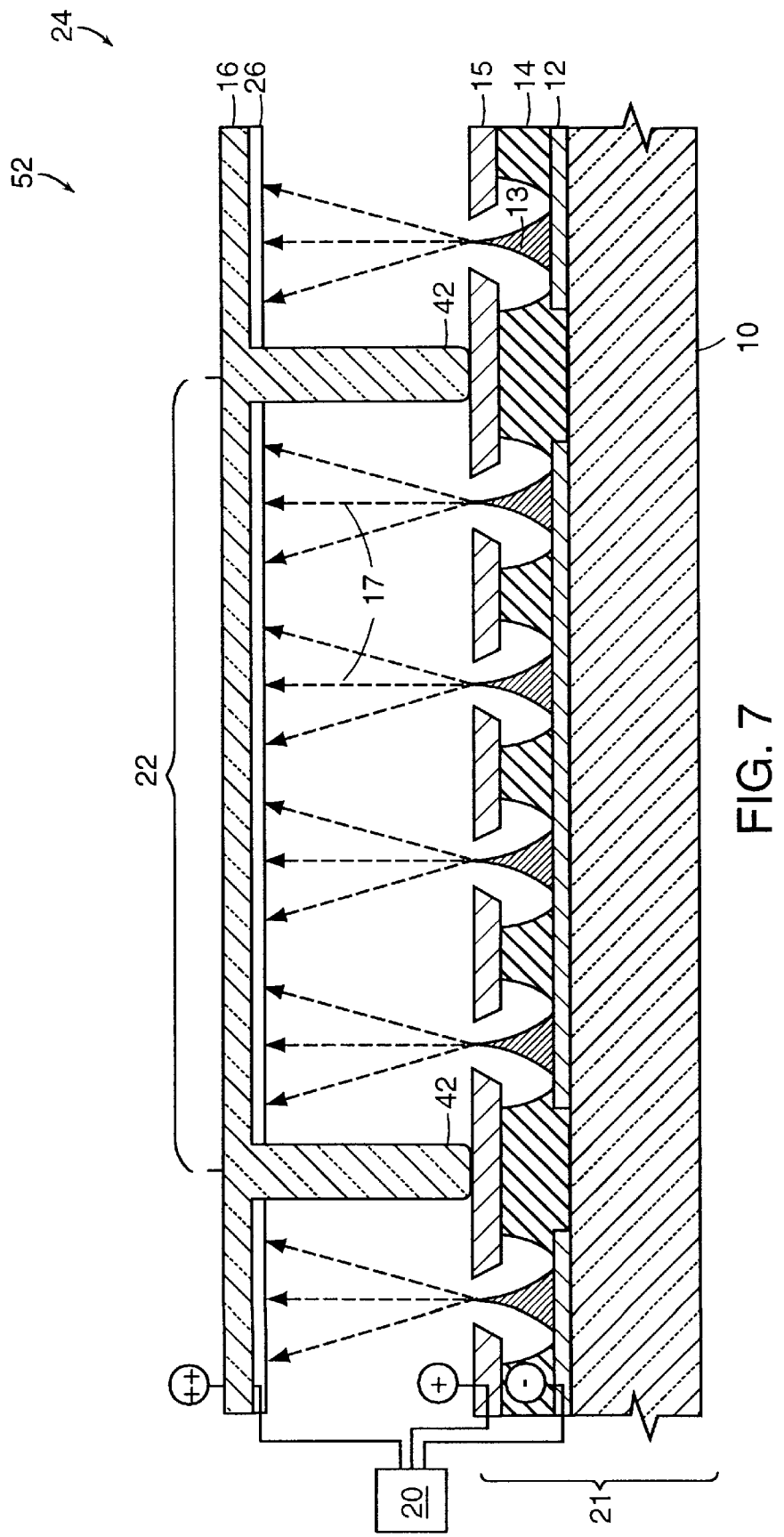

FIGS. 6 and 7 each illustrate displays of the field emission type having spacers according to two embodiments of the present invention, respectively. In FIG. 6, an FED 50 has spacers 40 that extend upwardly from substrate 10 of cathode 21 and contact faceplate 24, preferably without any adhesive. When filaments are drawn from substrate 10 of cathode 21, it is preferred that they be drawn before additional processing is done on that substrate. Accordingly, in the case of a field emission display, after filaments 40 are formed up from the substrate, conductive layers 12, polysilicon emitters 13, oxide layer 14, and a conductive layer for forming grid 15 are formed over substrate 10 with generally known techniques, and are etched according to generally known techniques to produce the cathode as shown in FIG. 6.

The deposition and etching can be performed with the filaments already formed. While spacers 40 are shown in FIG. 6 as being generally cylindrical, the filaments could be somewhat conical, particularly at the base as shown in FIG. 5. Such a geometry is indeed desirable in the embodiment of FIG. 6 because such spacers help deflect electrons that strike the spacer and prevent the electrons from multiplying on the surface of the spacer.

In FIG. 7, an FED 52 has spacers 42 that extend downwardly from substrate 16 of faceplate 24 and extend to conductive extraction grid 15. In this embodiment, filament spacers 42 are preferably drawn away from substrate 16 prior to further processing. In this case, after the filaments are formed and polished and after the filler is removed, conductive layer 26, a grill (not shown), and a phosphor coating (not shown) would be formed on faceplate 24 over substrate 16.

To form FED 50 or 52 as shown in FIG. 6 and FIG. 7, respectively, it may be possible for the faceplate and cathode to be formed to a more advance state, e.g., with conductive layers 12 or 26 already formed, and then have openings formed in any additional layers for the member to contact the substrate and to draw out filaments.

In the embodiments of FIGS. 6 and 7, spacers 40 and 42 are thus formed without break or interruption from respective substrates 10 and 16 and without any intermediate layers, such as adhesive layers. Accordingly, substrates 10 and 16 substantially lie in a plane, while respective spacers 40 and 42 extend orthogonally away from the plane in which the substrate lies. The end of the filaments may, but need not be, connected by adhesion to some part of the opposing cathode or faceplate; without adhesive, the spacers are kept in place by the resulting pressure differential after sealing.

In the embodiments of FIGS. 6 and 7, faceplate 24 and cathode 21 are vacuum sealed in a package. The number of spacers and their locations in the display will depend on their strength, and the pressure that must be counteracted.

Having described preferred embodiments of the present invention, it should be apparent that modifications can be made without departing from the scope of the claims.

I claim:
1. A field emission display comprising:
a faceplate including a transparent substrate; and
a cathode spaced parallel and close to the faceplate, the cathode including:
a cathode substrate,
at least one conductive layer over the substrate,
a plurality of emitters over the conductive layer, and
at least one spacer structure unitary with the cathode substrate and extending toward the faceplate.
2. A field emission display comprising:
a faceplate including:
a substrate,
a conductive layer over the substrate,
phosphor-coated pixel regions on the conductive layer, and
at least one spacer member unitary with the substrate and extending away from the substrate; and
a cathode spaced parallel and close to the faceplate, the cathode including:
a substrate,
at least one conductive layer over the substrate, and
a plurality of emitters formed over the conductive layer and oriented to emit electrons to the pixel regions; and
the spacer member extending from the faceplate substrate toward the cathode.
3. A display comprising:
a first plate having a first substrate where an image can be seen;
a second plate having a second substrate, the first and second substrates in parallel and close together; and
a plurality of spacers, unitary with one of the first and second substrates of one of the first and second plates and extending perpendicular toward the other of the first and second plates.
4. The field emission display of claim 1, wherein the spacer structure includes glass.
5. The field emission display of claim 1, wherein the spacer structure includes soda lime glass.
6. The field emission display of claim 1, wherein the spacer structure includes borosilicate glass.
7. The field emission display of claim 1, wherein the spacer structure has a length of at least 200 microns.
8. The field emission display of claim 1, wherein the spacer structure includes a polishable filler.
9. The field emission display of claim 1, wherein at least a portion of the spacer structure has a conical shape.
10. The field emission display of claim 1, wherein at least a portion of the spacer structure extends orthogonally to the cathode.
11. The field emission display of claim 1, wherein the spacer structure is adhered to the faceplate.
12. The field emission display of claim 1, wherein the space structure extends through the conductive layer.
13. The field emission display of claim 2, wherein the spacer member includes glass.
14. The field emission display of claim 2, wherein the spacer member has a length of at least 200 microns.
15. The field emission display of claim 2, wherein the spacer member includes a polishable filler.
16. The field emission display of claim 2, wherein at least a portion of the spacer member has a conical shape.
17. The display of claim 3, wherein at least one of the spacers includes glass.
18. The display of claim 3, wherein at least one of the spacers has a length of at least 200 microns.

19. The display of claim 3, wherein at least one of the spacers includes a polishable filler.

20. The display of claim 3, wherein at least a portion of at least one of the spacers has a conical shape.

21. A field emission display comprising:
a faceplate including a transparent substrate; and
a cathode spaced parallel and close to the faceplate, the cathode including:
a cathode substrate,
at least one conductive layer over the substrate,
a plurality of emitters over the conductive layer, and
at least one column unitary with the cathode substrate and extending toward the faceplate.

22. A field emission display comprising:
a faceplate including:
a substrate,
a conductive layer over the substrate,
phosphor-coated pixel regions on the conductive layer, and
at least one column unitary with the substrate and extending away from the substrate; and
a cathode spaced parallel and close to the faceplate, the cathode including:
a substrate,
at least one conductive layer over the substrate, and
a plurality of emitters formed over the conductive layer and oriented to emit electrons to the pixel regions; and
the column extending from the faceplate substrate toward the cathode.

23. A display comprising:
a first plate having a first substrate where an image can be seen;
a second plate having a second substrate, the first and second substrates in parallel and close together; and
a plurality of columns, unitary with one of the first and second substrates of one of the first and second plates and extending perpendicular toward the other of the first and second plates.

24. A display comprising:
a first plate having a first substrate where an image can be seen;
a second plate having a second substrate, the first and second substrates in parallel and close together; and
a plurality of cylindrical spacers including a polishable filler and being unitary with one of the first and second substrates of one of the first and second plates and extending perpendicular toward the other of the first and second plates.

25. A display comprising:
a first plate having a first substrate where an image can be seen;
a second plate having a second substrate, the first and second substrates in parallel and close together; and
a plurality of conical spacers including a polishable filler and being unitary with one of the first and second substrates of one of the first and second plates and extending perpendicular toward the other of the first and second plates.

26. A display comprising:
a first plate having a first substrate where an image can be seen;
a second plate having a second substrate, the first and second substrates in parallel and close together; and
a plurality of spacers having a length of at least 200 microns and being unitary with one of the first and second substrates of one of the first and second plates and extending perpendicular toward the other of the first and second plates.

27. A display comprising:
a first plate including a substrate layer, a conductive layer formed on the substrate layer, a conical emitter formed on the conductive layer, a dielectric layer formed on the conductive layer, and a conductive extraction grid formed on the dielectric layer;
a second plate substantially parallel to the first plate and including a transparent dielectric layer, a transparent conductive layer, a matrix grille formed over the transparent conductive layer and defining regions, and a phosphor coating formed over regions defined by the grille; and
a spacer unitary with at least one of the layers of at least one of the first and second plates and extending perpendicularly toward the other of the first and second plates.

* * * * *